Patented Mar. 2, 1954

2,671,068

UNITED STATES PATENT OFFICE 2,671,068

RUBBERLIKE MATERIALS AND AN UNSATURATED HYDROCARBON OIL

Herman S. Bloch, Chicago, Ill., assignor to Universal Oil Products Company, Chicago, Ill., a corporation of Delaware No Drawing. Application July 25, 1952, Serial No. 300,974

20 Claims. (Cl. 260—33.6)

This application is a continuation-in-part of my copending application Serial No. 36,262, filed June 30, 1948, now Patent No. 2,615,856, October 28, 1952.

This invention relates to a process for producing and employing a hydrocarbon material useful as a plasticizer and extender for rubber. More specifically, this invention is concerned with the production of vulcanized rubber-like composites comprising essentially a rubber, sulfur, and a hydrocarbon formed by treating aliphatic hydrocarbons with hydrogen fluoride.

An object of this invention is the production of a rubber plasticizer from the hydrogen fluoride catalyst layer used in conversion reactions of aliphatic hydrocarbons.

Another object of this invention is to produce a plasticizer and extender for rubber by reacting at least one aliphatic hydrocarbon selected from the group consisting of isoparaffinic and olefinic hydrocarbons in the presence of liquid hydrogen fluoride.

A further object of this invention is to plasticize a rubber selected from the group consisting of natural rubber and synthetic rubber by incorporating therein a hydrocarbon material boiling above about 150° C. and obtained from a hydrogen fluoride layer which has catalyzed the alkylation of an isoparaffinic hydrocarbon by an olefinic hydrocarbon.

A still further object of this invention is to plasticize a rubber by incorporating therein a hydrocarbon mixture derived from material boiling above about 150° C. obtained by reacting an olefinic hydrocarbon having at least three carbon atoms per molecule in the presence of hydrogen fluoride containing less than about 10% by weight of water at a temperature of from about 0° to about 150° C.

One specific embodiment of this invention comprises a process for plasticizing a rubber selected from the group consisting of polybutadiene, butadiene-α-methylstyrene copolymers, butadiene-vinyl toluene copolymers, butadiene-α-methylvinyltoluene copolymers, isoprenestyrene copolymers, isoprene-α-methylstyrene copolymers, isoprenevinyltoluene copolymers, isoprene-α-methylvinyltoluene coplymers, isopreneisobutylene copolymers, isoprene-acrylonitrile copolymers, conjugated hexadiene-styrene copolymers, conjugated hexadiene-α-methylstyrene copolymers, conjugated hexadiene-vinyltoluene copolymers, conjugated hexadiene-α-methylvinyltoluene copolymers, conjugated hexadiene-isobutylene copolymers, and conjugated hexadiene- acrylonitrile copolymers, which comprises incorporating therein a plasticizer selected from the group consisting of (1) a polyolefinic cyclic hydrocarbon residue containing conjugated olefinic unsaturation and produced by reacting in the presence of liquid hydrogen fluoride at a temperature of from about 0° to about 150° C. at least one aliphatic hydrocarbon selected from the group consisting of isoparaffinic and olefinic hydrocarbons, separating the resultant reaction products into a hydrocarbon layer and a hydrogen fluoride layer, recovering a substantially fluorine-free hydrocarbon material from said hydrogen fluoride layer, and removing from said last-named material the hydrocarbons boiling below about 150° C. to leave said residue, and (2) the reaction product of sulfur with said hydrocarbon residue.

Another embodiment of this invention relates to a process for plasticizing a rubber-like material which comprises incorporating therein from about 5 to about 30% by weight of a hydrocarbon mixture boiling above about 150° C. and produced by reacting an olefinic hydrocarbon having at least 3 carbon atoms per molecule with liquid hydrogen fluoride at a temperature of from about 0° to about 150° C.

For some time it has been recognized that the workability of natural rubber and synthetic polymers usable as rubber substitutes is improved by plasticizing and softening these rubber-like materials before subjecting them to milling, molding, and vulcanizing operations. Synthetic polymers and natural rubber have been plasticized by adding thereto substances such as oils, fats, waxes and the like, including tars, high molecular weight hydrocarbons recovered from sulfuric acid-hydrocarbon sludges, solvent extracts of petroleum oils, residues from the clay-treating of petroleum fractions and the like. Use of the aforementioned plasticizers causes the rubber-like materials to flow more easily and accordingly to process more advantageously in milling and in molding operations. However, many of the previously used plasticizers do not cause sufficient plasticization of the rubbery materials and sometimes give undesirable properties to the finished products. For example, some plasticizers are objectionable in odor, color, or in their influence upon the tensile strength and elongation of the finished rubber product.

A method of the prior art relates to treating cracked gasoline with 0.1 to 5% of its weight of substantially anhydrous hydrogen fluoride to remove "readily oxidizable and polymerizable constituents which tend to readily form gum on storage . . . without removing any substantial proportion of monoolefins." As this treatment removed from the cracked gasoline only constituents more easily polymerizable than the monoolefins, it is evident that the resultant polymerized constituents were different in chemical composition from my plasticizer oil which is recovered from a hydrogen fluoride layer containing conjunct polymer derived from a monoolefinic or isoparaffinic hydrocarbon which has been contacted with from 10 to 100% and preferably from about 30 to about 65% of its weight of liquid hydrogen fluoride.

I have obtained a hydrocarbon product which is useful, not only as a plasticizer, but also as an extender in natural rubber and synthetic rubbers. The term "extender" as herein employed refers to a substance which may be admixed with natural rubber or synthetic rubber to increase the volume and weight of the finished rubber-like material without affecting appreciably the desirable characteristics of the rubber-like material. Accordingly, the material employed as extender, should prferably covulcanize with the natural rubber, synthetic rubber, or mixtures of these materials.

Monoolefinic hydrocarbons utilizable in producing the plasticizer employed in this process have at least three carbon atoms per molecule and comprise propylene, the butylenes, pentenes, hexenes, heptenes, octenes, and higher boiling monoolefinic hydrocarbons. Of these materials, propylene has been found to require the higher portions of the catalyst: olefin ratios and of the temperature range cited for its satisfactory reaction, while the higher olefins undergo reaction even in the lower portions of the ranges of these variables. A preferred source of monoolefinic hydrocarbon is polymer gasoline which is formed, for example, by polymerizing propylene and butylenes or mixtures thereof in the presence of solid phosphoric acid catalyst, which is a calcined composite of a phosphoric acid and a siliceous carrier such as diatomaceous earth, also called kieselguhr. Fractions of cracked gasoline containing substantial amounts of olefins and relatively small proportions of aromatic hydrocarbons are also suitable charging stocks. These gasoline charging stocks may also contain certain amounts of paraffinic and naphthenic hydrocarbons some of which may be alkylated during the polymerization treatment. $C_3$ and $C_4$ fractions recovered from the products of cracking and a $C_4$ fraction recovered from butane dehydrogenation and containing mainly butylenes and normal butane with relatively little isobutane are also good charging stocks for this process.

Olefinic hydrocarbons having more than three carbon atoms per molecule are more desirable as charging stocks than propylene because of the increased yield of both saturated and unsaturated liquid products and improved properties of the products obtained from these preferred charging stocks, as well as because of their greater ease of reaction. About the same quantity and quality of plasticizer oil are obtained when charging any of the olefins having from 4 to about 12 carbon atoms per molecule. The different monoolefins having at least four carbon atoms per molecule appear to be mutually interconvertible by polymerization and depolymerization reactions at the conditions specified for this process.

Other unsaturated hydrocarbons which may be used in producing the plasticizer of this process include certain amounts of a more unsaturated olefinic hydrocarbon, namely, a dienic hydrocarbon as, for example, butadiene-1, 3, isoprene, cyclopentadiene and the like or an acetylenic hydrocarbon. These more unsaturated hydrocarbons comprising dienes and acetylenes are generally used in admixture with monoolefinic hydrocarbons to form highly unsaturated plasticizers.

Other aliphatic hydrocarbons utilizable in this process for producing a hydrocarbon plasticizer comprise isoparaffinic hydrocarbons or hydrocarbon mixtures containing substantial amounts of isoparaffinic hydrocarbons, preferably together with olefinic hydrocarbons. The isoparaffinic hydrocarbons may vary in molecular weight but it is frequently advantageous to employ a mixture of branched-chain paraffinic hydrocarbons boiling above about 150° C. For example, a material rich in higher boiling isoparaffinic and other branched-chain paraffinic hydrocarbons may comprise the higher boiling fractions of products formed by the alkylation of an isoparaffinic hydrocarbon with a monoolefinic hydrocarbon to form aviation gasoline. Such hydrocarbons boiling higher than aviation gasoline may be used as such or selected fractions thereof, such as the 150–200° C. or 200–450° C. fraction, may be reacted with hydrogen fluoride at a temperature of from about 30° to about 150° C. to form a still higher boiling hydrocarbon material, the latter utilizable as a plasticizer. The isoparaffins require a somewhat higher reaction temperature than olefins, since the former must first be cracked to olefinic fragments before conjunct polymerization can take place.

Hydroyen fluoride catalysts employed in this process and also referred to as hydrofluoric acid contain a major proportion by weight of hydrogen fluoride and generally may contain as much as 10% by weight of water, although the titratable acidity of the catalyst layer may be less than 90% because of the presence therein of dissolved organic compounds including highly unsaturated materials which are described more completely hereinafter. The catalyst preferred in this process is substantially anhydrous hydrogen fluoride, that is, 100% hydrogen fluoride, or the hydrogen fluoride of commerce, of 98+% purity.

The process for producing the plasticizer oil comprises essentially reacting an aliphatic hydrocarbon selected from the members of the group consisting of isoparaffinic and olefinic hydrocarbons in the presence of liquid hydrofluoric acid at conjunct polymerization conditions which include a temperature of from about 0° to about 150° C. and a pressure sufficient to maintain the reactants and hydrogen fluoride catalyst in substantially liquid phase, separating the resultant upper saturated hydrocarbon layer from the lower hydrogen fluoride sludge layer, and then decomposing the hydrogen fluoride sludge layer by water hydrolysis, by heating or by another suitable method to recover the plasticizer oil therefrom. The weight ratio of hydrogen fluoride catalyst to aliphatic hydrocarbon charging stock, that is, the isoparaffinic, olefinic, or combined mixture of isoparaffinic and olefinic hydrocarbons will vary from about 0.1 to about 10. When the hydrogen fluoride to aliphatic hydrocarbon weight ratio is less than about 0.1, it is necessary to recycle excessive amounts to the hydrocarbons in order to obtain good conversion, while increases in this ratio above about 10 effect very little further increase in yield of the desired reaction products but such increased ratio of hydrogen fluoride to the total isoparaffinic and olefinic hydrocarbons does decrease the capacity of the reactor and other treating equipment.

When isoparaffinic, olefinic, and mixtures of isoparaffinic and olefinic hydrocarbons are contacted with hydrofluoric acid catalyst containing less than about 10% by weight of water, a complex series of reactions occurs which is herein referred to in the aggregate as a "conjunct polymerization reaction." This conjunct polymerization reaction comprises an initial polymerization and condensation reaction between the hydrocarbons present in the reaction mixture and as the reaction progresses further, cyclization and isomerization of the polymers occur, accompanied by a hydrogen transfer reaction between the various hydrocarbons and conjunct polymers present in the reaction mixture whereby part of the conjunct polymers are converted into saturated hydrocarbons by virtue of the hydrogen transfer at the expense of other components which are converted into highly unsaturated hydrocarbons containing on an average of from about 2 to about 4 double bonds per molecule of which from about 40 to about 70% are conjugated. The resulting unsaturated conjunct polymers comprising a series of high molecular weight polyolefinic cyclic hydrocarbons become attached by weak chemical bonds to the hydrogen fluoride catalyst to form a sludge-like complex addition product in which fluorine is not, however, organically bound, since it can be substantially all recovered by treatment of the complex with water or with cold aqueous alkali. The saturated hydrocarbon conjunct polymers form a hydrogen fluoride-insoluble phase which upon settling of the reaction mixture separates as a distinct upper layer which is separated readily from the lower hydrogen fluoride layer in which the highly unsaturated polyolefinic cyclic hydrocarbons are contained.

It is of interest to note that in this type of copolymerization, in which hydrogen transfer occurs, the product recovered from the sludge or catalyst layer has a higher molecular weight than the charge stock, and is generally more unsaturated than the charge stock.

As the saturated hydrocarbons of the upper layer boil over about the same range of temperature as do the unsaturated plasticizer oil constituents recoverable from the hydrogen fluoride lower layer and as small amounts of the saturated hydrocarbons are entrained or mixed with the hydrogen fluoride lower layer, it is advisable to extract the hydrogen fluoride lower layer with a low boiling saturated hydrocarbon, preferably a paraffin having from 3 to about 8 carbon atoms per molecule, before hydrolyzing, or otherwise decomposing, the hydrogen fluoride lower layer to recover the unsaturated drying oil therefrom. From the lower layer, the hydrogen fluoride and plasticizer oil fractions are then separated by suitable means, for example, the lower layer may be added to water or ice whereby the hydrogen fluoride is dissolved in water to form an aqueous solution from which the plasticizer oil separates as an upper layer. Also the lower layer may be subjected to flash distillation to vaporize the hydrogen fluoride from the higher boiling highly unsaturated plasticizer oil. When the lower layer is separated by distillation methods, the recovered hydrogen fluoride is suitable for recycling to the process to effect reaction of additional quantities of charged monoolefinic hydrocarbons.

Passage of inert gas, such as nitrogen, hydrogen, methane, ethane, carbon dioxide, and the like through the distillation system in which the hydrogen fluoride is being separated, assists in the recovery of the highly unsaturated plasticizer oil. Separation of hydrogen fluoride from the plasticizer oil present in the lower layer is also assisted by carrying out the flash distillation of said lower layer in a tower containing catalytic packing material formed from graphitized carbon or from a metal selected from the members of the group consisting of aluminum, copper, cobalt, lead, cadmium, and an alloy of copper, such as brass, and preferably in the presence of an inert carrier gas to assist in removing the librated hydrogen fluoride.

Another method of decomposing the hydrogen fluoride-plasticizer oil mixture of the lower layer formed by the conjunct polymerization of olefinic hydrocarbons in the presence of hydrogen fluoride, is to introduce the lower layer or sludge into an inert liquid, such as a paraffinic hydrocarbon contained in a decomposition zone and maintained at a temperature near its boiling point. The decomposition zone or reactor tower may contain a catalytic packing material in the liquid zone of this reactor tower and an inert gas may also be passed therethrough. Hydrogen fluoride so liberated is vaporized, condensed, and conducted to storage while the inert liquid containing the dissolved, highly unsaturated plasticizer oil is withdrawn from the decomposition zone, either intermittently or continuously, and replaced by fresh liquid. This liquid should be readily separable from the plasticizer oil dissolved therein, and it should also be relatively inert to the hydrogen fluoride sludge and to the products of the decomposition of the sludge. If a paraffinic naphtha is employed, its normal boiling point should be from about 100° to 150° C., so that it may be separated by fractional distillation from the plasticizer oil which boils generally from about 150° to about 450° C.

Another source of rubber plasticizer is the hydrogen fluoride catalyst layer which is recovered from an alkylation process in which aviation gasoline is formed by reacting an isoparaffinic hydrocarbon with a monoolefinic hydrocarbon such as a butylene or normally liquid monoolefinic hydrocarbon. When such an alkylation process is conducted for some time in the presence of a hydrogen fluoride catalyst, a substantial proportion of organic material accumulates in the hydrogen fluoride catalyst layer and may be recovered therefrom by suitable means. For example, the used hydrogen fluoride catalyst may be subjected to fractional distillation to separate therefrom hydrogen fluoride and leave as a residue a relatively high boiling hydrocarbon material. The organic material may also be separated from the used catalyst with water whereby a hydrocarbon layer separates from the aqueous hydrogen fluoride. The resultant hydrocarbon material may be used as such as a rubber plasticizer, but I prefer to subject it to fractional distillation to remove therefrom the relatively low boiling hydrocarbons so as to recover organic material of higher molecular weight frequently having the characteristics of a resin which I have found to be suitable for mixing with natural rubber and various synthetic rubbers.

Study of the ultraviolet and infrared absorption spectra and other properties of plasticizer oil fractions formed from polymer gasoline and boiling from about 150° to about 200° C., shows that these hydrocarbons are nonaromatic and that most of them contain a pair of conjugated double bonds with one of these double bonds in a ring of five carbon atoms and the other double bond in an alkenyl side chain. Thus a cyclopentane ring may be combined with a methylene group or a vinyl group. However, some of the plasticizer oil hydrocarbons which contain a cyclopentenyl ring also contain more than two substituent groups but each of these groups is highly substituted. The higher boiling fractions of this plasticizer oil boiling up to about 450° C. contain nonaromatic, polycyclic, polyenic hydrocarbons which are generally bicyclic. In both monocyclic and polycyclic hydrocarbons the five-carbon atom ring portions of the molecules are combined with at least two alkyl groups or two unsaturated aliphatic groups. The data obtained on these fractions indicate that one of the double bonds comprised by the conjugated diene systems of the plasticizer oil is within a five-carbon atom ring and the other double bond is in an alkenyl or alkapolyenyl substituent. Alkapolyneyl groups that may be present are highly branched and contain isolated unsaturation as well as conjugated unsaturation. Some of the typical hydrocarbons contained in the plasticizer oil mixtures so produced from polymer gasoline are represented structurally by the following formula:

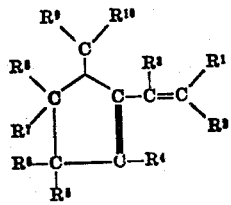

wherein the radicals $R^1$ to $R^{10}$ are selected from the group consisting of hydrogen and alkyl, alkenyl and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the plasticizer oil formed from polymer gasoline are believed to have structures that may be represented by the formula:

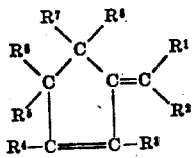

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^3$ to $R^8$ are hydrocarbon radicals, and not more than two of the substituents $R^1$ to $R^4$ are hydrogen.

The unstaurated polycyclic hydrocarbon plasticizer oil formed as hereinabove described and utilized in this process, differs in many ways from the unstaurated hydrocarbons heretofore recovered from sulfuric acid sludges recovered during petroleum refining and described as rubber compounding agents or plasticizers. Differences observed in the ultraviolet and infrared absorption spectra of these types of plasticizer oils are given in Table 1. In order to interpret the results of the ultraviolet absorption spectra, use is made of the "specific extinction coefficient" indicated in the table as "E." The term "specific extinction coefficient" is defined by the following equation:

$$E = \frac{\log_{10} I_0 / I}{CL}$$

where $I_0$=intensity of incident light (cell filled with isooctane)
$I$=intensity of transmitted light (cell filled with solution of plasticizers in iso-octane solvent.)
$C$=concentration of plasticizer in cell in grams per liter
$L$=length of cell path in centimeters.

Isooctane, more exactly known as 2,2,4-trimethylpentane, is employed as the solvent since this octane gives substantially no ultraviolet adsorption in the wave length examined.

Also the symbol $\lambda_{max}$ is used to refer to the wave length at which the maximum absorption of ultraviolet light occurs.

TABLE 1

Ultraviolet and infrared absorption spectra of hydrocarbon plasticizers

| | Plasticizer of Example 1 boiling above 320° C. | Plasticizer recovered from petroleum hydrocarbon-sulfuric acid sludge |
|---|---|---|
| Ultraviolet absorption spectra: | | |
| $\lambda_{max}$ | 250 mµ | 230 mµ. |
| E | 31 | 99. |
| $\lambda_{max}$ | | 258 mµ. |
| E | | 79. |
| Infrared absorption spectra. | Absorption due almost entirely to nonaromatic conjugated diolefin. There is comparatively weak absorption with generally sharp bands, and evidence of the complete lack of aromatic compounds. | Dominant absorption is that of aromatic compounds. There is comparatively strong absorption with generally broad bands, some of which are assignable to aromatic compounds. |

The data on the ultraviolet absorption given in Table 1 show that the plasticizer of this process has a single absorption maximum at a wave length of 250 mµ while the plasticizer recovered from sulfuric acid petroleum hydrocarbon sludge has two ultraviolet absorption maxima, namely, at 230 mµ and 258 mµ. Accordingly, from these data it is concluded that the predominant ultraviolet absorption originated in these two plasticizers in entirely different types of compounds. Ultraviolet absorption observed in the plasticizer of my process is due to nonaromatic conjugated diolefin compounds while that obtained on the plasticizer recovered from petroleum hydrocarbon-sulfuric acid sludge is due to aromatic compounds.

The unsaturated polycyclic hydrocarbon plasticizers of my process also differ in many other ways from the unsaturated hydrocarbon plasticizers recovered from sulfuric acid refinery sludges. These two types of plasticizers differ in the types of hydrocarbons present therein, the percentages of carbon and hydrogen, the molecular weights, and the degrees of unsaturation, as indicated by the comparative results give in Table 2.

TABLE 2

Physical and chemical properties of hydrocarbon plasticizers

| Column No. | 1<br>Plasticizer of Example 1 boiling above 320° C. | 2<br>A plasticizer[1] recovered from petroleum hydrocarbon-sulfuric acid sludge |
|---|---|---|
| Formula | $(CH_{1.73})$<br>C 28.4; H, 49.2 (Av.)<br>$C_nH_{2n-7n}$ (Av.) | $(CH_{1.33})$.<br>C, 24.9; H, 33.2 (Av.).<br>$C_nH_{2n-10.6}$ (Av.). |
| Analysis: | | |
| Percent Carbon | 87.4 | 90. |
| Percent Hydrogen | 12.6 | 10. |
| Mol. Wt | 390 | 300–1,000 (Av. 400). |
| Structures | cyclopolyenic | Polycyclic aromatics. |
| Drying Properties | Dries | Nondrying. |
| Iodine No | (264)[3] | 40–60. |
| Bromine No | 166 | (25–38).[2] |
| Maleic Anhydride Value | 56 | |
| Acid No | 0 | 0. |
| Olefinic Double Bonds per Molecule: | | |
| Total (based on bromine number) | 4 | 2. |
| Conjugated | 1.7 | |
| Color | (Reddish yellow 17 Gardner) | Red-Brown. |

[1] These data are taken also from the article by Fritz Rostler and Vilma Mehner, India Rubber World, August 1, 1941, pp. 47–51 and the article by L. Bornstein and F. Rostler, Modern Plastics, April 1942.
[2] Equiv. of Br No.
[3] Equiv. of Iodine No.

The plasticizer oil of the present process is a sweet-smelling material ranging in color from light yellow to dark brown and on exposure to air dries to a solid film. It has an average molecular weight of from about 250 to about 500, although oils having molecular weights of as low as about 140 to as high as about 1000 have been prepared, these oils comprising compounds of substantially the same homologous structure and chemical properties. These properties include average bromine numbers of from about 120 to about 200; average number of double bonds per molecule of more than 2 and less than 5; densities of about 0.85 to about 0.95; specific dispersions of about 125 to about 175 (but usually below about 145); specific refractions of about 0.327 to about 0.335, and carbon to hydrogen atomic ratios close to 1:1.7.

The relatively high molecular weight hydrocarbons which are so formed by treating an aliphatic hydrocarbon or aliphatic hydrocarbon mixture with liquid hydrogen fluoride are highly unsaturated and are covulcanizable with rubber I have found also that these unsaturated hydrocarbon materials will dissolve or react with at least 40% by weight of sulfur, forming products which range from viscous oils to hard brittle solids, depending upon the sulfur content.

Mixtures of the cyclic polyenic plasticizer with sulfur react only sluggishly at 150° C. and somewhat more readily at 200° C., but at 240° C., the reaction is rapid and smooth.

In general, a composite of a sulfur-vulcanizable rubber and my highly unsaturated plasticizer requires a larger amount of sulfur for vulcanization than that used heretofore with rubber compounding mixtures containing no plasticizer or containing a plasticizer of the prior art such as those derivatives from sulfuric acid sludges recovered from the treatment of hydrocarbons. The amount of additional sulfur preferred (in excess over the amount normally used with the rubber) is approximately 1 part sulfur per every 10 parts plasticizer added to each 100 parts of rubber. If the sulfur is added as a solution in or as a reaction product with the plasticizer, the rate of sulfur to plasticizer may be readily adjusted so that all of the sulfur required by the rubber-plasticizer composition is contained within the amount of plasticizer that is added to the rubber. This is readily shown by the following table:

| Parts Plasticizer Per 100 Parts Rubber | Parts Sulfur Per 100 Parts Rubber (Normal) | Extra Sulfur for Plasticizer, Parts Per 100 Parts | Total Sulfur, Parts Per 100 Parts Rubber | Percent Sulfur in Plasticizer Required (Based on Plasticizer) |
|---|---|---|---|---|
| 10 | 3 | 1 | 4 | 40 |
| 20 | 3 | 2 | 5 | 25 |
| 30 | 3 | 3 | 6 | 20 |

When such a composite of unsaturated hydrocarbon mixture and sulfur is heated to form a viscous fluid, and the latter is admixed with natural rubber or synthetic rubber, the sulfur is dispersed readily and uniformily throughout the mass of rubber-like material. In addition to this advantage of aiding in the mixing of sulfur with rubber, the unsaturated hydrocarbonaceous material described above also has a softening and plasticizing effect to make the rubber or rubber-like material more workable in rubber treating equipment.

The plasticizer and extender referred to herein may be applied to an elastomer selected from the group comprising natural rubbers and synthetic rubber-like polymers comprising diene polymers and copolymers of dienes with monoolefinic monomers. These various elastomers include not only natural rubber and poly-butadiene, but also copolymers of butadiene with at least one member selected from the group of monoolefinic monomers consisting of styrene, α-methylstyrene, vinyltoluenes, α-methylvinyltoluenes, isobutylene, and acrylonitrile; copolymers of isoprene with at least one member of the group of monoolefinic monomers consisting of styrene, α-methylstyrene, vinyltoluene, α-methylvinyltoluene, isobutylene, and acrylonitrile; and copolymers of conjugated hexadienes with at least one member of the group of monoolefinic monomers consisting of styrene, methylstyrene, vinyltoluene, α-methylvinyltoluene, isobutylene, and acrylonitrile. Of the various hexadienes, 2-methyl-1,3-pentadiene, 2,3-dimethyl-1,3-butadiene, and 1,3-hexadiene are most preferable. However, no intention to exclude other polymerizable conjugated hexadienes is meant hereby. The term "a rubber" is employed in this specification and in the claims in a general sense to include caoutchouc, reclaimed rubber, balata, gutta percha, rubber isomers, and like products whether or not admixed with fillers, pigments, vulcanizing or accelerating agents. This product may also be used in the reclaiming of vulcanized rubber in which case the plasticizer is not separated from the reclaimed rubber but both materials are utilized in admixture.

The following examples are given to illustrate the character of results obtained by the use of specific embodiments of the present process, although the data presented are not introduced with the intention of unduly restricting the generally broad scope of the invention.

EXAMPLE I

During a period of 94.5 hours, a total of 109 kgs. of polymer gasoline was contacted with 35.6 kgs. of hydrogen fluoride at a temperature of 78° C. and at a pressure of 10.7 atmospheres. During this run, the charging rates of polymer gasoline and hydrogen fluoride were 1610 and 381 cc. per hour, respectively, through a reactor of 1300 cc. capacity. The ratio of the volume of polymer gasoline to the hydrogen fluoride was thus 4.2. The average time during which the polymer gasoline was in contact with the hydrogen fluoride was about 39 minutes. The reaction mixture so obtained consisted of 90.7 kg. of an upper hydrocarbon layer and 44.3 kg. of a hydrogen fluoride layer, the latter containing some organic compounds. The hydrogen fluoride layer on treatment with ice water followed by washing of the separated oil with caustic soda solution and filtering through a column of soda-lime and anhydrous barium oxide yielded 16.7 kg. of a clear oil which gave a neutral reaction when shaken with water and an indicator and was substantially fluorine-free. This hydrocarbon oil had the following properties:

| | |
|---|---|
| Bromine number | 181 |
| Molecular weight | 290 |
| No. double bonds/mol. (by Br. No.) | 3.3 |
| No. conjugated double bonds/mol | 1.9 |
| Gardner color | 11–12 |

The hydrocarbon oil mentioned above was then distilled to remove the lower boiling hydrocarbons, leaving in the still the higher boiling 50% of the hydrocarbon oil. The material remaining in the still which was used subsequently as a rubber plasticizer, had the following properties:

| | |
|---|---|
| $d_4^{20}$ | 0.872. |
| Boiling range at 760 mm. Hg | Above 320° C. |
| Color | 17 (Gardner). |
| Viscosity (25° C.) | 6 poises. |
| Bromine number | 166. |
| Molecular weight | 390. |
| Double bonds/mol. (by Br. No.) | 4. |
| No. conjugated double bonds/mol | 1.7. |

The plasticizer prepared as above described was then compounded with a polybutadiene polymer, a butadiene-vinyl toluene copolymer, an isoprene-isobutylene copolymer, an isoprene-styrene copolymer, and an isoprene-vinyl toluene copolymer according to the following standard formula: 100 g. of polymer or copolymer, 50 g. of carbon black (Kosmobile 77), 5 g. of zinc oxide, 1.5 g. of mercaptobenzothiazole, 20 g. of plasticizer, and sulfur, the latter added in amounts of 2, 3, 4, or 5 grams in separate tests. In case of the isoprene-isobutylene copolymer formulation, 1.0 g. of tetramethyl thiuram monosulfide was used as the accelerator. The composites prepared according to this test formula were then vulcanized at 140° C. for 90 minutes. The results of these tests are presented in the following table:

TABLE 1

Properties of vulcanized rubber containing 20% of plasticizer

| Parts Sulfur/100 Parts Rubber | Tensile Strength at break | Modulus at 300% Elongation | Elongation |
|---|---|---|---|
| Polybutadiene: | | | |
| 2 | − | 0 | 0 |
| 3 | 0 | + | 0 |
| 4 | 0 | + | 0 |
| 5 | + | + | + |
| Butadiene-Vinyl toluene: | | | |
| 2 | − | 0 | + |
| 3 | 0 | 0 | + |
| 4 | 0 | + | + |
| 5 | + | + | 0 |
| Isoprene-Styrene: | | | |
| 2 | 0 | 0 | 0 |
| 3 | + | + | + |
| 4 | + | 0 | + |
| 5 | 0 | 0 | + |
| Isoprene-Vinyl toluene: | | | |
| 2 | 0 | − | 0 |
| 3 | 0 | 0 | + |
| 4 | + | 0 | + |
| 5 | + | + | + |
| Isoprene-isobutylene: | | | |
| 2 | 0 | 0 | + |
| 3 | 0 | + | + |
| 4 | 0 | 0 | + |
| 5 | 0 | + | + |

+ = superior.
0 = average.
− = inferior.

EXAMPLE II

A mixture of hydrocarbons recovered from a hydrogen fluoride catalyst which had been used in a commercial plant in which isobutane was alkylated with butylenes in the presence of hydrogen fluoride catalyst was diluted with an equal volume of petroleum ether, washed, and the hydrogen fluoride-free hydrocarbon material recovered. Properties of the recovered hydrocarbon material are as follows:

| | |
|---|---|
| $d_4^{20}$ | 0.95 |
| Bromine number | 101 |
| Acid number | 0.4 |
| Viscosity (25° C.) poises | 3,350 |
| Molecular weight | 379 |
| Diene value | 8.7 |
| Conjugated double bonds/mol | 0.26 |
| Color (Gardner) | 18 |

The above mentioned hydrocarbon mixture was then used as a plasticizer in the standard test formula referred to in Example I. The results of these tests are presented in the following table:

TABLE 2

*Properties of vulcanized rubber containing 20% of plasticizer*

| Parts Sulfur/100 Parts Rubber | Tensile Strength at break | Modulus at 300% Elongation | Elongation |
|---|---|---|---|
| Polybutadiene: | | | |
| 2 | — | 0 | 0 |
| 3 | 0 | + | 0 |
| 4 | 0 | + | + |
| 5 | + | + | + |
| Butadiene-Vinyl toluene: | | | |
| 2 | — | 0 | 0 |
| 3 | — | 0 | + |
| 4 | 0 | + | — |
| 5 | + | + | 0 |
| Isoprene-Styrene: | | | |
| 2 | + | + | — |
| 3 | + | + | 0 |
| 4 | + | 0 | + |
| 5 | + | 0 | + |
| Isoprene-Vinyl toluene: | | | |
| 2 | 0 | + | — |
| 3 | 0 | + | 0 |
| 4 | 0 | + | + |
| 5 | 0 | 0 | + |
| Isoprene-Isobutylene: | | | |
| 2 | 0 | 0 | + |
| 3 | 0 | + | + |
| 4 | 0 | 0 | + |
| 5 | 0 | + | + |

+ = superior.
0 = average.
— = inferior.

EXAMPLE III

A highly aromatic hydrocarbon was recovered from sulfuric acid sludge formed during the treatment of lubricating oil with sulfuric acid. This aromatic sludge oil was used as a plasticizer and compounded with an isoprene-styrene copolymer in the following test formula: 100 g. of isoprene-styrene copolymer, 50 g. of carbon black, 5 g. of zinc oxide, 1.5 g. of mercaptobenzothiazole, 20 g. of plasticizer, and 5 g. of sulfur. The sample was then vulcanized at 140° C. for 90 minutes. In the following table, a comparison of the properties of the thusly produced rubber versus the properties of similar rubbers prepared with the plasticizers of Examples I and II is given:

TABLE 3

*Comparison of effect of aromatics v. nonaromatic plasticizers*

| Plasticizer Preparation | Tensile Strength at break | Modulus at 300% Elongation | Elongation |
|---|---|---|---|
| Example I | 0 | 0 | + |
| Example II | + | 0 | + |
| Example III | 0 | — | 0 |

+ = superior.
0 = average.
— = inferior.

From the results given in Table 3, it is seen that vulcanized isoprene-styrene rubber of approximately the same tensile strength but greater elongation was produced when using the plasticizer of Example I than when a plasticizer recovered from lubricating oil-sulfuric acid sludge was tested similarly. The vulcanized isoprene-styrene rubber of Example II was superior in tensile strength and elongation to that containing plasticizer recovered from lubricating oil-sulfuric acid sludge. For special uses in which a partially cured (vulcanized) rubber is desirable (for example, a flexible material for shoe soles) the plasticizers of Examples I and II have specific advantages over the plasticizer recovered from the lubricating oil-sulfuric acid sludge.

I claim as my invention:

1. A composition of matter comprising a rubber selected from the group consisting of polybutadiene, butadiene-α-methylstyrene copolymers, butadiene-vinyltoluene copolymers, butadiene-α-methylvinyltoluene copolymers, isoprene-styrene copolymers, isoprene-α-methylstyrene copolymers, isoprene-vinyltoluene copolymers, isoprene-α-methylvinyltoluene copolymers, isoprene-isobutylene copolymers, isoprene-acrylonitrile copolymers, conjugated hexadiene-styrene copolymers, conjugated hexadiene-α-methylstyrene copolymers, conjugated hexadiene-vinyltoluene copolymers, conjugated hexadiene-α-methylvinyltoluene copolymers, conjugated hexadiene-isobutylene copolymers, and conjugated hexadiene acrylonitrile copolymers, and a plasticizer selected from the group consisting of: (1) an unsaturated polycyclic hydrocarbon residue containing conjugated olefinic unsaturation and produced by reacting in the presence of liquid hydrogen fluoride at a temperature of from about 0° to about 150° C. at least one aliphatic hydrocarbon selected from the group consisting of isoparaffinic and olefinic hydrocarbons, separating the resultant reaction products into a hydrocarbon layer and a hydrogen fluoride layer, recovering a substantially fluorine-free hydrocarbon material from said hydrogen fluoride layer, and removing from said last-named material the hydrocarbons boiling below about 150° C. to leave said residue, and (2) the reaction product of sulfur with said hydrocarbon residue.

2. A composition of matter comprising a rubber selected from the group consisting of polybutadiene, butadiene-α-methylstyrene copolymers, butadienevinyltoluene copolymers, butadiene-α-methylvinyltoluene copolymers, isoprene-styrene copolymers, isoprene-α-methylstyrene copolymers, isoprene-vinyltoluene copolymers, isoprene-methyl-vinyltoluene copolymers, isoprene-isobutylene copolymers, isoprene-acrylonitrile copolymers, conjugated hexadiene-styrene copolymers, conjugated hexadiene-α-methylstyrene copolymers, conjugated hexadiene-vinyltoluene copolymers, conjugated hexadiene-α-methylvinyltoluene copolymers, conjugated hexadiene-isobutylene copolymers, and conjugated hexadiene acrylonitrile copolymers, and an unsaturated polycyclic hydrocarbon residue containing conjugated olefinic unsaturation and produced by reacting an olefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

3. A composition of matter comprising a rubber selected from the group consisting of polybutadiene, butadiene-α-methylstyrene copolymers, butadiene-vinyltoluene copolymers, butadiene-α-methylvinyltoluene copolymers, isoprene-styrene copolymers, isoprene-α-methylstyrene copolymers, isoprene-vinyltoluene copolymers, isoprene-α-methylvinyltoluene copolymers, isoprene-isobutylene copolymers, isoprene-acrylonitrile copolymers, conjugated hexadiene styrene-copolymers, conjugated hexadiene-α-methylstyrene copolymers, conjugated hexadienevinyltoluene copolymers, conjugated hexadiene-α-methylvinyltoluene copolymers, conjugated hexadiene-isobutylene copolymers, and conjugated hexadiene acrylonitrile copolymers, and an unsaturated polycyclic hydrocarbon residue containing conjugated olefinic unsaturation and produced by reacting a branched chain paraffinic hydrocarbon in the presence of liquid hydrogen fluoride at a temperature of from about 30° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

4. A composition of matter comprising a rubber selected from the group consisting of polybutadiene, butadiene-α-methylstyrene copolymers, butadiene-vinyltoluene copolymers, butadiene - α - methylvinyltoluene copolymers, isoprene-styrene copolymers, isoprene-α-methylstyrene copolymers, isoprene-vinyltoluene copolymers, isoprene-α-methylvinyltoluene copolymers, isoprene-isobutylene copolymers, isoprene-acrylonitrile copolymers, conjugated hexadiene-styrene copolymers, conjugated hexadiene-α-methylstyrene copolymers, conjugated hexadienevinyltoluene copolymers, conjugated hexadiene-α-methylvinyltoluene copolymers, conjugated hexadiene-isobutylene copolymers, and conjugated hexadiene-acrylonitrile copolymers, and from about 5 to about 30% by weight of a plasticizer comprising essentially an unsaturated polycyclic olefinic hydrocarbon mixture boiling above about 150° C. and produced by reacting an olefinic hydrocarbon having at least four carbon atoms per molecule with liquid hydrogen fluoride at a temperature of from about 0° to about 150° C.

5. A composition of matter comprising a rubber selected from the group consisting of polybutadiene, butadiene-α-methylstyrene copolymers, butadiene-vinyltoluene copolymers, butadiene - α - methylvinyltoluene copolymers, isoprene-styrene copolymers, isoprene-α-methylstyrene copolymers, isoprene-vinyltoluene copolymers, isoprene-α-methylvinyltoluene copolymers, isoprene-isobutylene copolymers, isoprene-acrylonitrile copolymers, conjugated hexadiene-styrene copolymers, conjugated hexadiene-α-methylstyrene copolymers, conjugated hexadiene-vinyltoluene copolymers, conjugated hexadiene-α-methylvinyltoluene copolymers, conjugated hexadiene-isobutylene copolymers, and conjugated hexadiene acrylonitrile copolymers, and a hydrocarbon plasticizer oil boiling from about 150° to about 450° C., having an average molecular weight of from about 250 to about 1000, an average bromine number of from about 120 to about 200, an average number of double bonds per molecule of more than 2 and less than 5, a density of from about 0.85 to about 0.95, and a carbon to hydrogen atomic ratio of about 1:1.7.

6. The composition defined in claim 5 further characterized in that the rubber comprises polybutadiene.

7. The composition defined in claim 5 further characterized in that the rubber comprises a copolymer of butadiene and a vinyltoluene.

8. The composition defined in claim 5 further characterized in that the rubber comprises a copolymer of isoprene and isobutylene.

9. The composition defined in claim 5 further characterized in that the rubber comprises a copolymer of isoprene and vinyltoluene.

10. The composition defined in claim 5 further characterized in that the rubber comprises a copolymer of isoprene and styrene.

11. A co-vulcanized mixture of a rubber-like butadiene homopolymer and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

12. A co-vulcanized mixture of a rubber-like butadiene-vinyltoluene copolymer, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

13. A co-vulcanized mixture of a rubber-like isoprene-isobutylene copolymer, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

14. A co-vulcanized mixture of a rubber-like isoprene-vinyltoluene copolymer, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

15. A co-vulcanized mixture of a rubber-like isoprene-styrene copolymer, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

16. A co-vulcanized mixture of a rubber-like butadiene homopolymer, sulfur, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

17. A co-vulcanized mixture of a rubber-like butadiene-vinyltoluene copolymer, sulfur, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

18. A co-vulcanized mixture of a rubber-like isoprene-isobutylene copolymer, sulfur, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

19. A co-vulcanized mixture of a rubber-like isoprene-vinyltoluene copolymer, sulfur, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

20. A co-vulcanized mixture of a rubber-like isoprene-styrene copolymer, sulfur, and a plasticizer oil, the latter comprising essentially an unsaturated polycyclic olefinic hydrocarbon residue produced by reacting a normally liquid monoolefinic hydrocarbon in the presence of liquid hydrogen fluoride at a temperature of from about 0° to about 150° C., separating the resultant reaction product into a hydrocarbon layer and a hydrogen fluoride layer, recovering a substantially fluorine-free hydrocarbon material from said hydrogen fluoride layer, removing from said substantially fluorine-free hydrocarbon material the hydrocarbons boiling below about 150° C. to leave said residue.

HERMAN S. BLOCH.

No references cited.